July 8, 1941.  A. P. FERGUESON  2,248,750
REMOTE CONTROL FENDER SHIELD LATCH
Filed Aug. 25, 1938  3 Sheets-Sheet 1
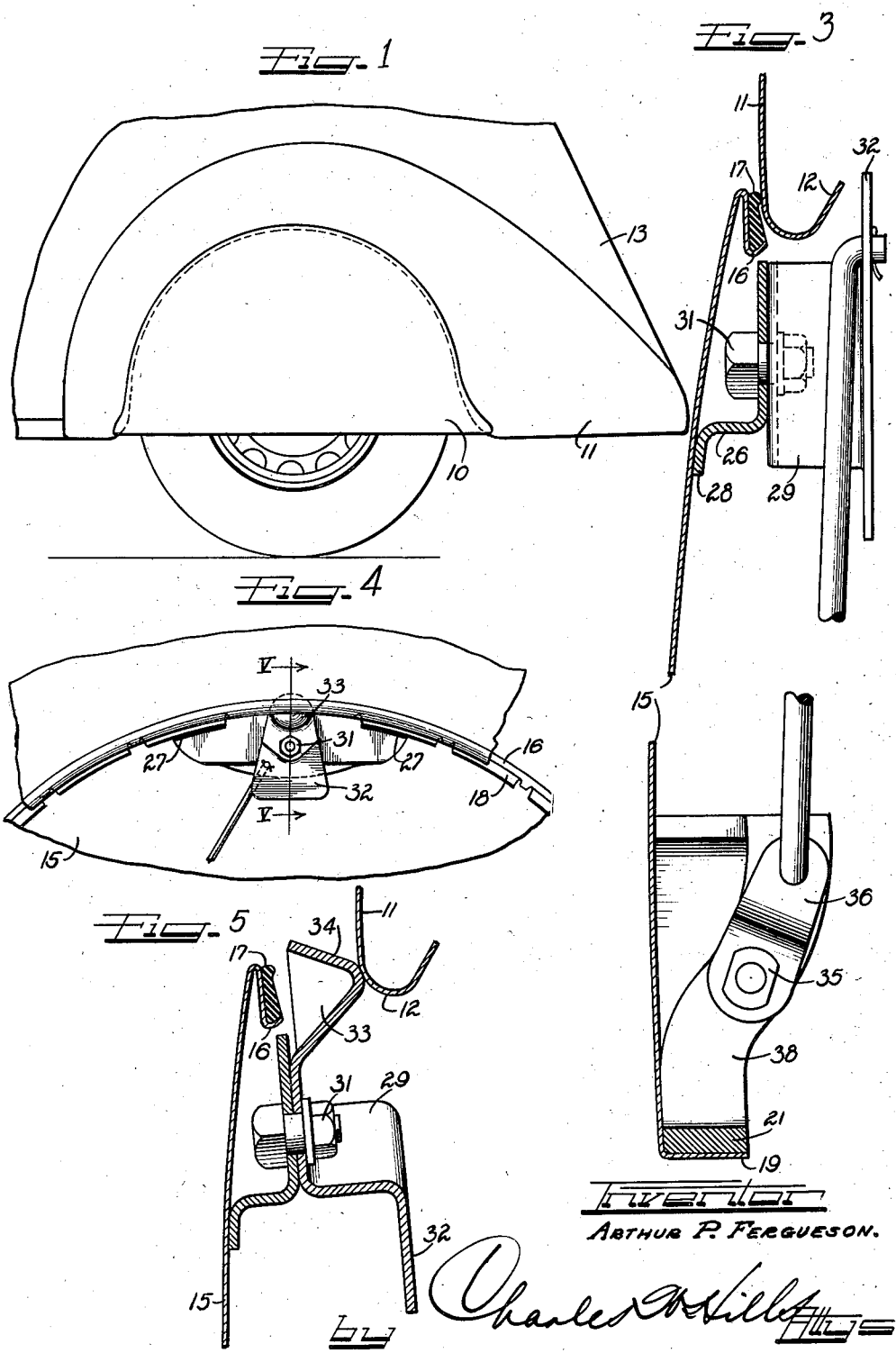
Inventor
ARTHUR P. FERGUESON.

July 8, 1941. A. P. FERGUESON 2,248,750
REMOTE CONTROL FENDER SHIELD LATCH
Filed Aug. 25, 1938 3 Sheets-Sheet 2
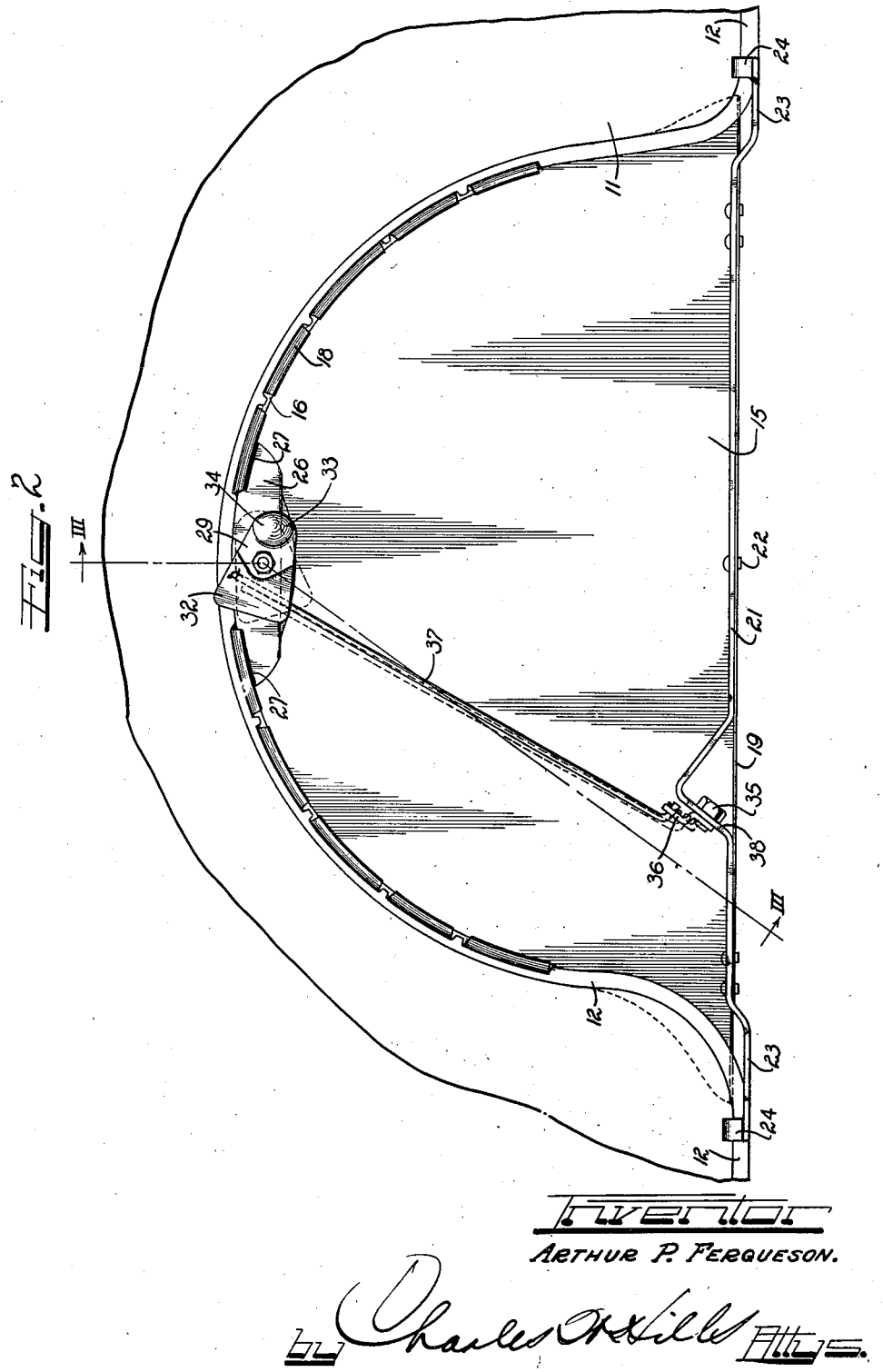
Inventor
ARTHUR P. FERGUESON.
by Charles H. Mills Attys.

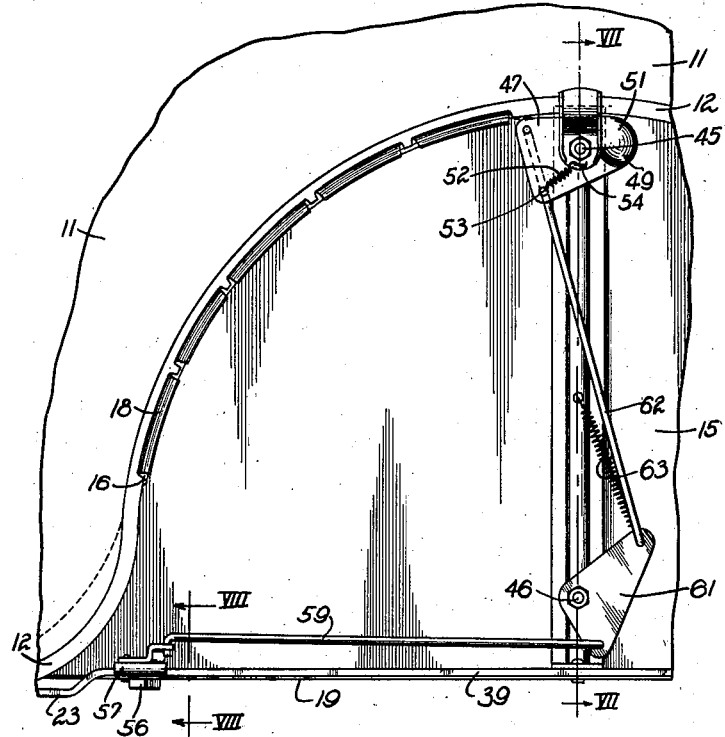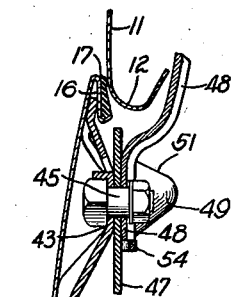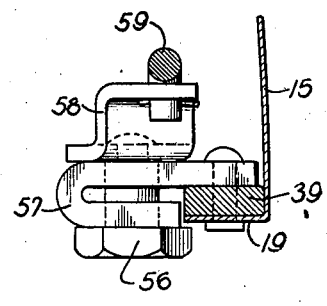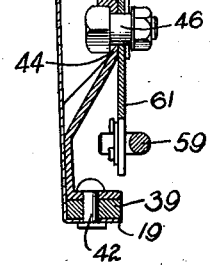

Patented July 8, 1941

2,248,750

UNITED STATES PATENT OFFICE 2,248,750

REMOTE CONTROL FENDER SHIELD LATCH

Arthur P. Fergueson, Detroit, Mich., assignor to Houdaille-Hershey Corporation, Detroit, Mich., a corporation of Michigan Application August 25, 1938, Serial No. 226,648

17 Claims. (Cl. 292—240)

This invention relates to ornamental fender shields, and more particularly to a novel means for preventing the accidental displacement of the fender shield from the fender on which it is mounted and to means for forcibly disengaging the fender shield from the fender when it is desired to remove it.

In designing an ornamental fender shield or skirt adapted to cover the usual wheel access opening in a vehicle fender, it is important that the means employed to secure the fender shield in place be simple and easy to operate both in assembling the fender shield on the vehicle fender and in removing it. It must also remain securely attached when in use so that it will not be displaced by severe jolts which the vehicle may receive, and it must be free from perceptible vibration and noise.

It is an object of this invention to provide a novel and ornamental fender shield which possesses the above highly desirable characteristics.

It is a further object of this invention to provide an improved fender shield which is economical to manufacture and which is rugged and reliable in use.

It is a still further object of this invention to provide a novel, ornamental fender shield of the snap-on type which has a positive latch to hold it in place in addition to resilient snap-on devices.

Another object of this invention is to provide a positive latch at the top of a fender shield and to provide means at the bottom of the fender shield for operating the latch.

Another object of this invention is to provide a novel, ornamental fender shield of the snap-on type and having positive means for forcing it off when it is desired to remove it.

Another object of this invention is to provide a fender shield which has a positive latch mechanism for holding it in place or a positive cam mechanism for forcing it off and in which the mechanism can be operated without the hand of the operator touching anything in back of the fender shield and in which no part of the mechanism can be seen by a person standing near the vehicle upon which the fender shield is mounted.

Another object of this invention is to provide a novel, ornamental fender shield which has a combined positive latch and force-off cam at the top of the fender shield and which is operable from behind the lower edge of the fender shield by means of a concealed mechanism.

The novel features which I believe to be characteristic of my invention are set forth with particularity in the appended claims. My invention itself, however, both as to its organization and its manner of construction, together with further objects and advantages thereof, may best be understood by reference to the following description, taken in connection with the accompanying drawings, in which:

Figure 1 is a side elevation of a part of an automobile showing the rear fender and one of the preferred embodiments of my novel ornamental fender shield mounted thereon;

Figure 2 (on the second sheet of drawings) is a side elevation of the embodiment of the invention shown in Figure 1, mounted on a fender and latched in place, as seen from the position of the wheel and looking out;

Figure 3 is a cross section on an enlarged scale, on the line 3—3 of Figure 2, with some parts shown unsectioned, the central portion of the fender shield being omitted in order to reduce the height of the drawing, and looking in the direction of the arrows;

Figure 4 is a side elevation of the upper portion of the embodiment of my invention shown in Figure 2 as it is being removed from its normal position on a fender;

Figure 5 is a cross section, on an enlarged scale, on the line 5—5 of Figure 4, looking in the direction of the arrows;

Figure 6 is a side elevation, similar to Figure 2, of the inner side or back of another embodiment of my invention as seen from the position of the wheel and looking out;

Figure 7 is a cross section on the line 7—7 of Figure 6, looking in the direction of the arrows; and Figure 8 is a cross section on the line 8—8 of Figure 6, looking in the direction of the arrows.

In the embodiment of the invention illustrated in Figures 1 to 5 of the drawings, a fender shield 10 is mounted in the wheel access opening of the fender 11 of an automobile 13. The particular fender 11 which is shown in the drawings is of the high-crowned type having its lower edge along the bottom and around the wheel opening curled under to form a channel-like reinforcement 12. This form of fender is merely illustrative, as my invention may obviously be used with other constructions such as, for example, a wide fenderless body in which the wheels are housed directly in the body and the wheel access openings are in the side of the body.

The fender shield 10 comprises a sheet metal panel 15 which is slightly curved both horizontally and vertically in order to enhance its appearance and that of the automobile on which it is mounted. The upper edge of the panel 15 folds back upon itself and then curves away from the panel to form an upwardly facing channel 16 adapted to fit around under the rounded edge 12 of the fender 10 above the wheel access opening. As may be seen in Figure 2, the channel 16 extends around the curved upper edge of the fender shield and along the front and rear edges to within a short distance of the bottom of the fender shield.

At the center of the top of the fender shield, the wall of the channel 16 which fits inside of the fender is cut away so as to leave a gap for the latching and forcing-off device which is an important feature of the present invention and which is described below.

The channel 16 contains a strip of lining 17, formed of rubber, fabric or other suitable material, which prevents contact between the metal panel and the face of the fender, thereby preventing marring of the finish or the development of any squeaks or rattles. The side of the channel 16 away from the plane of the panel 15 is divided into a plurality of separate portions or fingers 18 which curve down and provide cam-like outer surfaces leading over the top of the side of the channel 16. The division of this side of the channel 16 into separate fingers 18 makes the side of the channel resilient, which aids in springing the fender shield on and in holding it in place.

The lower edge of the panel 15 is bent over horizontally to form a flange 19, on top of which a reinforcing bar 21 is secured by rivets 22 or other suitable fastening means. The end portions 23 of the bar 21 are offset down and back away from the plane of the fender shield panel 15 and are formed into hooks 24 shaped so that their ends will fit down into the upwardly facing channel 12 along the bottom of the fender. Thus the ends 24 of the bar 21 are supported in the rolled edge 12 of the fender and hold the fender shield up into place.

The end portions 23 of the bar 21 are not riveted to the panel 15 and are therefore free to bend up and down slightly. This enables the fender shield to be put into place by holding it tipped out at the top, hooking the ends 24 of the bar 15 up behind the side of the fender 11 and down into the open rolled edge 12 at the bottom of the fender, and then forcing the fender shield down and swinging it into the plane of the side of the fender 12. The springiness of the end portions 23 of the bar 21 allows the fender shield to be forced down and snaps it up into place and holds it there tightly as soon as it is swung up into the plane of the side of the fender, and the hooked ends 24 act as trunnions while it is being swung up. The cam surfaces on the fingers 18 around the top of the panel 15 engage the edge of the fender 11 as the shield is being swung up and aid in forcing the fender shield down, and their resiliency lessens the distance which it must be forced down before snapping up into place.

The resilient ends 23 of the bar 21 and the channel 16 embracing the edge 12 of the fender are all that is normally needed to hold the fender shield in position. However, to provide against the remote possibility that the fender shield might become accidentally displaced, I have provided a positive latching means. I have also provided a positive pry-off means in order to remove the fender shield when desired. Otherwise it might be necessary to pry the fender shield off with some instrument such as a screwdriver and possibly damage the finish both on the fender and the shield. These two means have been combined in one simple mechanism concealed behind the panel 15.

The combined latch-in-place and pry-off mechanism comprises a bracket 26 secured in back of the top of the panel 15. This may be spot-welded directly to the main part of the panel 15, but, in order to avoid marring the surface of the panel, the bracket 26 is formed with ears 27 at the top which are spot-welded to the outer side of the channel 16 and with an offset portion 28 which bears against but is not welded to the back of the panel 15. A combined latch and cam member 29 is pivoted on the back of the bracket 26 by a bolt 31 in a position where it can swing up past the upper edge of the panel 15 through the gap in the side of the channel 16 mentioned above.

One end 32 of the pivoted member 29 is offset to the rear so that, when it is swung up as shown in full lines in Figure 2, it extends up in back of the rolled edge 12 of the fender and forms a positive latch which would keep the fender shield on even if the fender shield were pushed down far enough to disengage the channel 16 from the edge 12 of the fender. The other end 33 of the pivoted member 29 is the pry-off end and is formed to provide a cam surface 34 which slopes back away from the plane of the panel 15 and towards the pivot 31. When the pry-off end 33 is swung up towards the positions shown in Figure 4, the cam surface 34 engages the rolled edge 12 of the fender and causes a force with downward and outward components to act on the cam surface 34. The downward component pushes the fender shield down, the downward movement being permitted by the resiliency of the end portions 23 of the bar 15 at the bottom of the fender shield, and the outward component pushes the top of the shield out as soon as it has moved down far enough to remove the channel 16 around its upper edge from the edge 12 of the fender.

When the latch and cam member 29 is in its intermediate position, as shown in dotted lines in Figure 2, no portion of it projects up far enough to hit the edge 12 of the fender and interfere with the inward movement of the fender shield as it is being put on.

The combined latch and cam member 29 is operated from a stud 35 which is rotatably mounted in a hole in a portion 38 of the bar at the bottom of the fender shield. A short arm 36 is fixed to the stud 35 and is connected to the pivoted member 29 at the top of the fender shield by a link 37. As may be seen from Figures 2 and 3, the portion 38 of the bar 21 which carries the stud 35 is bent up at an angle so that the arm 36 will swing in a plane approximately parallel to the link 37 and is offset away from the panel 15 so that a wrench may be easily applied to the head of the stud 35 to turn it.

A second embodiment of my invention is shown in Figures 6 to 8. In this embodiment of the invention, the panel 15 with the channel 16 around the upper edge, the lining 17 in the channel, the resilient fingers 18 formed from the edge of the channel and the flange 19 along the bottom, are exactly like the panel 15 in the first embodiment. Except that there is no offset portion 38 near the center, the bar 39 riveted along the bottom 19 of the panel is exactly like the bar 21 in the first embodiment, and its resilient end portions 23 cooperate with the upcurled edge 12 of the fender in the same way when the fender shield is being put on or removed.

The difference between the two embodiments lies in the latch and pry-off mechanism. In this embodiment, this mechanism comprises a vertical stay 41 at the back of the center of the panel 15, the bottom of the stay being held to the bar 39 and flange 19 at the bottom of the panel 15 by a rivet 42 and the top of the stay fitting up under the side of the channel 16 at the top of the panel. Sliding of the top of the stay may be prevented by making it a tight fit, by spot-welding it to the channel or to the body of the panel 15, or by fitting it between lugs struck out from the side of the channel. The main part of the stay 41 is formed with a rib, but near the top and the bottom, the stay is formed into flat-topped bosses 43 and 44, which carry studs or pivots 45 and 46.

The upper pivot 45 carries a pry-off cam 47 and a latch 48 which, in this form of the invention, are two separate members not fixed to each other and individually rotatable on the pivot 45. The pry-off cam 47 is roughly triangular in shape, and its nose 49 is formed into a high boss with a sloping cam surface 51 which functions exactly like the similar cam surface 34 on the combined latch and pry-off member in the first form of the invention in forcing off the fender shield.

The latch 48 is flanged at its sides for strength and is shaped so that, when it is swung into upright position as shown in the drawings, it will extend up a substantial distance behind the edge 12 of the fender 11 and therefore positively prevent the removal of the fender shield. The latch is swung towards its vertical position by a coil spring 52 whose ends are hooked into a hole 53 in the pry-off cam and into an arch-shaped strip of metal 54 sheared free at its sides from the body of the latch and pressed up above the surrounding metal. How far the latch 48 is swung by the spring 52 is limited by the raised nose 49 of the pry-off cam 47 against which the side of the latch 48 rests when it is in the position illustrated. Thus, when the pry-off cam 47 is turned to remove the fender shield, the latch 48 will swing with it and be carried down out of the way where it will not interfere with the removal of the fender shield. In putting on the fender shield, the latch 48 is pushed over and down out of the way by hand as the fender shield is swung up into position and bears lightly against the incurled edge 12 of the fender. Then, as soon as the fender shield is snapped into place, the spring 52 snaps the latch 48 into the position illustrated.

The mechanism for rotating the pry-off cam 47 comprises a stud 56 journaled in a bracket 57 riveted to the bottom bar 39 of the fender shield. The bottom of the stud is formed into a hexagonal head which can be reached by a wrench, such as the wrench used in changing tires, and its upper end has a short arm 58 fixed to it. The arm 58 is connected by a link 59 to a bell crank 61 mounted on the pivot 46 near the lower end of the stay 41, and the bell crank 60 is connected in turn by a second link 62 to the pry-off cam 47 at the top of the stay 41. Thus, rotation of the stud 56 which is readily accessible from the outer side of the fender shield will operate the pry-off cam 47 and the latch 48 and allow the fender shield to be easily removed.

In order to prevent the spring 52 that connects the latch to the pry-off cam from swinging the cam up in the way of putting the fender shield on when the latch 48 is pushed out of the way, a comparatively strong coil spring 63 is hooked between one end of one of the links and a hole in the rib of the stay 41, the spring 63 acting to keep the pry-off cam swung over to its out-of-the-way position as shown in the drawings.

While I have shown only two embodiments of my invention, it will of course be understood that I do not wish to be limited thereto, since many modifications may be made, and I therefore contemplate by the appended claims to cover all such modifications as fall within the true spirit and scope of my invention.

I claim as my invention:

1. In a fender shield, a latch, a stud rotatably mounted on the back of the fender shield and having a head engageable by a wrench reaching in under the bottom edge of said shield, and means for operating the latch from the stud.

2. In a fender shield, a latch, a stud mounted on the back of the shield so as to be rotatable about a vertical axis and having a wrench-receiving head projecting down below the level of the lower edge of the shield, and a linkage connecting the stud to the latch for operating the latch by turning the stud.

3. In a fender shield, a forcing-off device, a stud rotatably mounted on the back of the fender shield and having a head engageable by a wrench reaching in under the bottom edge of said shield, and means for operating the forcing-off device from the stud.

4. In a fender shield, a forcing-off device, a stud mounted on the back of the shield so as to be rotatable about a vertical axis and having a wrench-receiving head projecting down below the level of the lower edge of the shield, and a linkage connecting the stud to the forcing-off device for operating the forcing-off device by turning the stud.

5. In a cover for a wheel access opening in the side of a vehicle which can be removed by having its upper edge forced down and out, a combined latch and pry-off mechanism comprising a concealed pivot on the back of the cover just below the top thereof, a latch and a pry-off cam rotatable on the pivot and having a portion able to swing up a considerable distance above and behind the edge of said opening and a portion able to push said cover down and out, a concealed stud rotatably mounted on the back of said cover and having a head engageable by a wrench reaching in under the bottom edge of said cover, and linkage connecting the stud to the latch and the pry-off cam so that the latch and the pry-off cam can be turned by a wrench applied to the stud.

6. In a cover for a wheel access opening in the side of a vehicle which can be removed by having its upper edge forced down and out, a combined latch and pry-off mechanism comprising a concealed pivot on the back of the cover just below the top thereof, a latch and a pry-off cam rotatable on the pivot and having a portion able to swing up a considerable distance above and behind the edge of said opening and a portion able to push said cover down and out, a concealed stud rotatably mounted on the back of said cover and having a head engageable by a wrench reaching in under the bottom edge of said cover, and linkage connecting the stud to the latch and the pry-off cam so that the latch and the pry-off cam can be turned by a wrench applied to the stud.

7. In a cover for a wheel access opening in the side of a vehicle which can be removed by having its upper edge forced down and out, a combined latch and pry-off mechanism comprising a concealed pivot on the back of the cover just below the top thereof, a latch and a pry-off cam formed of two separate members individually rotatable on the pivot, the latch having one end that can swing up a considerable distance above and behind the edge of said opening and the pry-off cam being formed to bear against the edge of said opening and to push said cover down and out, resilient means tending to hold the latch and the pry-off cam in a predetermined position relative to each other, a concealed stud rotatably mounted on the back of said cover and having a head engageable by a wrench reaching in under the bottom edge of said cover, and linkage connecting the stud to the pry-off cam so that the pry-off cam and the latch can be turned by a wrench applied to the stud.

8. In a snap-on-and-off cover for a wheel access opening in the side of a vehicle, a combined latch and pry-off mechanism comprising a pivot just below the top of said cover, a latch and a pry-off cam formed of two separate members mounted on the pivot and rotatable with respect to each other, resilient means tending to hold the latch and the pry-off cam in a predetermined position relative to each other, and positive means for rotating said cam.

9. In a snap-on-and-off cover for a wheel access opening in the side of a vehicle, a combined latch and pry-off mechanism comprising a pivot just below the top of said cover, a latch and a pry-off cam formed of two separate members mounted on the pivot and rotatable with respect to each other, resilient means tending to hold the pry-off cam in its inoperative position, manually operable positive means for turning the pry-off cam, and resilient means for holding the latch in a predetermined position with respect to the cam, the predetermined position being such that the latch is in its operative position when the cam is in its inoperative position, and the resilient means for holding the latch being weak enough to allow the latch to be pushed over to its inoperative position without causing the cam to move.

10. In a cover for a wheel access opening, a sheet metal panel, mechanism at the top of the back of the panel, a flat bar fixed along the bottom of the panel, a portion of said bar being offset to the rear of said panel and lying approximately in a plane passing through said mechanism, a stud journaled in a hole in said offset portion of the bar and carrying an arm, and a link connecting said stud to said mechanism.

11. In a cover for a wheel access opening, a sheet metal panel, mechanism on the back of the panel, a flat bar fixed along the bottom of the panel, a portion of said bar being offset to the rear of said panel, a stud journaled in a hole in said offset portion of the bar, and an operative connection between said stud and said mechanism.

12. In a cover for a wheel access opening, a sheet metal panel, a bar fixed along the bottom of the panel, a stay on the back of the panel and fixed to the top of the panel and to said bar, mechanism carried by said stay near its upper end, a rotatable vertical stud carried by said bar, an arm fixed to the stud, and a linkage connecting the arm to the mechanism.

13. In a cover for a wheel access opening, a sheet metal panel, a bar fixed along the bottom of the panel, a stay on the back of the panel and fixed to the top of the panel and to said bar, mechanism carried by said stay near its upper end, a rotatable vertical stud carried by said bar, an arm fixed to the stud, and a linkage connecting the arm to the mechanism, said linkage including a bell crank pivoted on the lower part of said stay.

14. In a fender shield comprising a sheet metal panel and a bar secured along the bottom of the panel, said panel being adapted to cover the wheel access opening in the side of a fender and to overlap the edge of the fender around said opening and having its upper edge formed into an upwardly facing trough adapted to fit the edge of the fender around said opening and said bar being formed with resilient portions projecting beyond the ends of the panel and terminating in hooked ends adapted to fit down into a rolled edge on the bottom of the fender, a sheet metal support member having its upper portion secured to said panel by one wall of said trough and having a lower portion resting against the back of said panel but not fastened directly thereto, a pivot carried by said support member, a latch and pry-off cam rotatable on said pivot, said latch and pry-off cam having one portion formed to extend up behind the edge of said fender and having another portion with a surface that can be forced up against the edge of the wheel access opening and that slopes down and away from the plane of said panel, a stud rotatably supported by the bar along the bottom of the panel and having a wrench-receiving head accessible from under the lower edge of the panel, an arm fixed to the stud, and a linkage connecting said arm to the latch and pry-off arm.

15. In a fender shield comprising a sheet metal panel and a bar secured along the bottom of the panel, said panel being adapted to cover the wheel access opening in the side of a fender and to overlap the edge of the fender around said opening and having its upper edge formed into an upwardly facing trough adapted to fit the edge of the fender around said opening and said bar being formed with resilient portions projecting beyond the ends of the panel and terminating in hooked ends adapted to fit down into a rolled edge on the bottom of the fender, a sheet metal support member having its upper portion secured to said panel by being welded to one side of said trough and having a lower portion resting against the back of said panel but not fastened directly thereto, a pivot carried by said support member, a latch and pry-off cam rotatable on said pivot, said latch and pry-off cam having one portion formed to extend up behind the edge of said fender and having another portion with a surface that can be forced up against the edge of the wheel access opening and that slopes down and away from the plane of said panel, a stud rotatably supported by the bar along the bottom of the panel and having a wrench-receiving head accessible from the lower edge of the panel, an arm fixed to the stud, and a linkage connecting said arm to the latch and the pry-off cam.

16. In a fender shield comprising a sheet metal panel and a bar secured along the bottom of the panel, said panel being adapted to cover the wheel access opening in the side of a fender and to overlap the edge of the fender around said opening and having its upper edge formed into an upwardly facing trough adapted to fit the edge of the fender around said opening and said bar being formed with resilient portions projecting beyond the ends of the panel and terminating in hooked ends adapted to fit down into a rolled edge on the bottom of the fender, a sheet metal support member having its upper portion secured to said panel by being wedged between the body of said panel and the adjacent side of said trough and having a lower portion resting against the back of said panel and fastened to said panel only through said bar, a pivot carried by said support member, a latch and pry-off cam rotatable on said pivot, said latch and pry-off cam having one portion formed to extend up behind the edge of said fender and having another portion with a surface that can be forced up against the edge of the wheel access opening and that slopes down and away from the plane of said panel, a stud rotatably supported by the bar along the bottom of the panel and having a wrench-receiving head accessible from the lower edge of the panel, an arm fixed to the stud, and a linkage connecting said arm to the latch and the pry-off cam.

17. In a cover for a wheel access opening in the side of a vehicle which can be removed by having its upper edge forced down and out, a combined latch and pry-off mechanism comprising a concealed pivot on the back of the cover just below the top thereof, a latch and a pry-off cam formed of two separate members individually rotatable on the pivot, the latch having one end that can swing up a considerable distance above and behind the edge of said opening and the pry-off cam being formed to bear against the edge of said opening and to push said cover down and out, resilient means tending to hold the latch and the pry-off cam in a predetermined position relative to each other, a second concealed pivot on the back of the cover near the lower edge thereof and perpendicular to the plane thereof, a bell crank on said second pivot, a concealed stud at the bottom of said cover at one side of said second pivot, said stud being rotatable about a vertical axis, an arm on said stud, and links connecting said arm to said bell crank and said bell crank to said pry-off cam so that the pry-off cam and the latch can be turned by turning the stud.

ARTHUR P. FERGUESON.